May 5, 1953   H. A. McCLELLAN   2,637,240
LICENSE TAG FASTENER
Filed Feb. 13, 1950
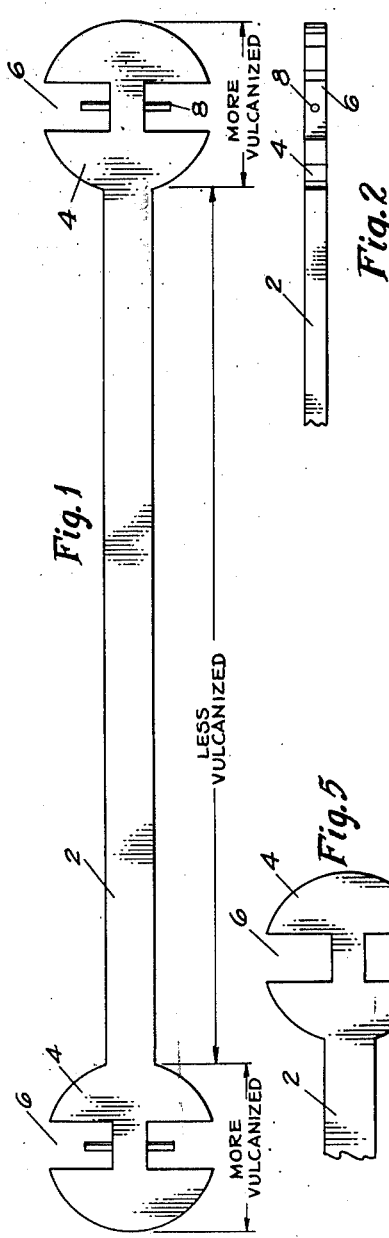
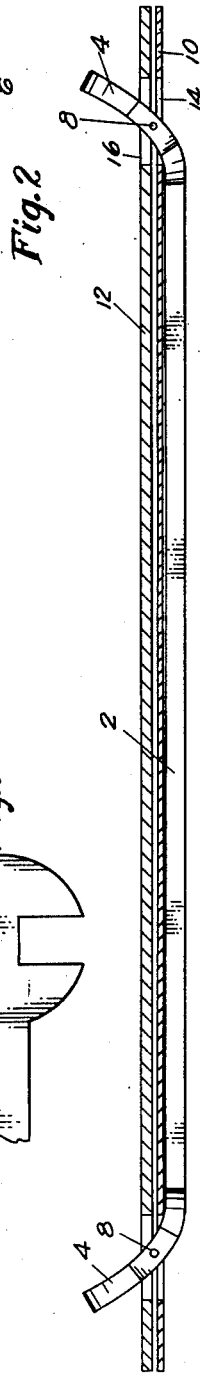
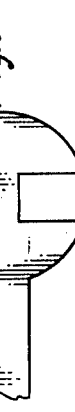
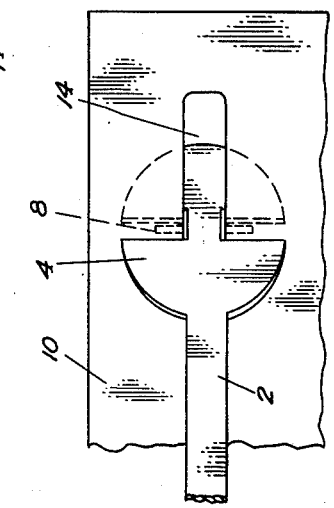
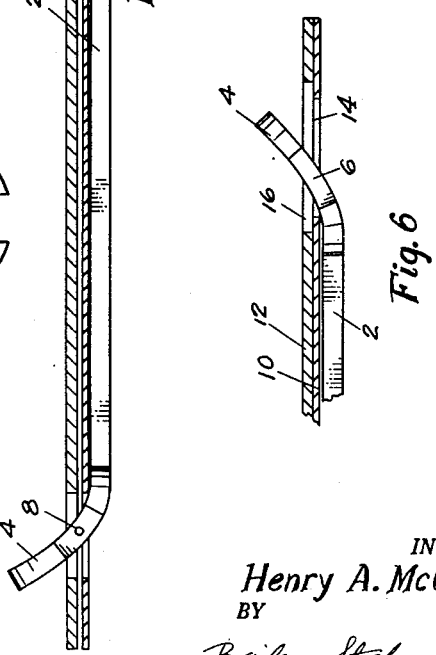
INVENTOR.
Henry A. McClellan
BY
Bailey, Stephens & Huettig
ATTORNEYS Patented May 5, 1953

2,637,240

UNITED STATES PATENT OFFICE 2,637,240

LICENSE TAG FASTENER

Henry A. McClellan, Jacksonville, Fla.

Application February 13, 1950, Serial No. 143,864

4 Claims. (Cl. 85—5)

The invention relates to fasteners and more especially to arrangements for fastening automobile license plates to the frames or supports provided for them.

The primary object of the invention is to provide an inexpensive device for mounting license plates on automobiles which is easy to use.

Another object of the invention is to provide such a device which will not mar the finish of the car. This is of particular importance to dealers who wish to mount tags temporarily on new automobiles without scratching the surfaces of the license plate supports.

Another object of the invention is to provide a device by which license plates can be quickly attached to and removed from their frames, the device being capable of being used over and over.

A further object of the invention is to provide a device of this type which dispenses with the need for tools in attaching and removing license plates.

Still another object of the invention is to provide an arrangement of a simple nature which will hold the license plate slightly spaced from its carrier so as to prevent rubbing between them.

Still a further object of the invention is to provide a device formed in a single piece, requiring no assembly of parts in its manufacture and avoiding the danger of the loss of parts in use or storage.

An additional object of the invention is to provide an arrangement formed of a single strip of rubber which exerts a resilient pressure for holding the license plate on its frame.

Further objects and advantages of the invention will appear more fully from the following description, especially when taken in conjunction with the accompanying drawings which form a part thereof.

In the drawings:

Fig. 1 shows in side elevation a fastener embodying my invention;

Fig. 2 is a plan view of one end thereof;

Fig. 3 is a cross section through a license plate and a frame secured by the fastener of Fig. 1;

Fig. 4 is a front view of a portion of Fig. 3;

Fig. 5 shows in side elevation one end of a modified form of fastener; and

Fig. 6 is a cross-section through a part of a license plate and frame secured by the fastener of Fig. 5.

The fastener according to the invention is formed of a single piece of rubber including a strip 2 of a length somewhat less than the distance between the securing slots of a license plate and enlarged heads 4 at either end thereof. The heads may, if desired, be somewhat stiffer than the strip, which can be accomplished by vulcanizing these portions to a higher degree than the strip. The strip itself should be sufficiently elastic to stretch, and to exert an elastic pull on the two heads when it is so stretched.

Each head is provided in opposed faces with notches 6, these notches extending transversely to the longitudinal axis of the strip 2 and being preferably of a width somewhat greater than the combined thickness of the plate and frame with which they are to be used.

Extending from the bottom wall of each notch is a projection 8 which is integral with the material of the fastener, and may be formed in the same way as the projections which are found on rubber tires.

Fig. 3 shows the use of such a fastener in securing a license plate 10 to a frame or carrier 12, these two having slots 14 and 16 respectively. In assembling such an arrangement, one of the heads 4 is partly inserted through the slots and then turned so that the outer portion of the head engages behind the frame, while the inner portion is in front of the license plate, the opposite walls of slots 6 thus engaging the back of the frame and the front of the license plate respectively. In turning the parts, the projections 8 are allowed to move into position between the license plate and the frame, so as to hold these in spaced relation to one another and to prevent the license plate from rubbing on the frame. The strip 2 is then stretched and the other head 4 is inserted in the same fashion.

Figs. 5 and 6 shows a similar arrangement, in which however, the projections 8 are omitted. This arrangement is assembled in the same manner as that shown in Figs. 1 to 4.

It will be apparent that the device disclosed herein is inexpensive and easy to manufacture. It is also simple to apply and to remove, so that it is easy to interchange plates or to shift them from one car to another. Because it is of rubber, it does not tend to scratch or mar the finish of new automobiles to which it may be applied.

While I have described herein some embodiments of my invention, I wish it to be understood that I do not intend to limit myself thereby except within the scope of the claims hereto or hereinafter appended.

I claim:

1. A license tag fastener comprising a plane strip of rubber of a normal length somewhat less than the space between the slots in a license tag and enlarged heads integral with said strip at either end thereof and in the plane thereof and adapted to pass through such slots, each head having notches opening in its opposed edges directed transversely with respect to the longitudinal axis of the strip, said notches extending completely through the head in a direction perpendicular to the plane of the strip.

2. A license tag fastener comprising a strip of rubber of a normal length somewhat less than the space between the slots in a license tag and enlarged heads integral with said strip at either end thereof and adapted to pass through such slots, each head having notches in its opposed edges directed transversely with respect to the longitudinal axis of the strip, and having outward projections from the bottoms of said notches engageable between a license plate and a frame for holding the same in spaced relation.

3. A license tag fastener comprising a plane strip of rubber of a normal length somewhat less than the space between the slots in a license tag and enlarged heads integral with said strip at either end thereof and in the plane thereof and adapted to pass through such slots, each head having notches opening in its opposed edges directed transversely with respect to the longitudinal axis of the strip, said heads being less flexible than said strip, said notches extending completely through the head in a direction perpendicular to the plane of the strip.

4. A license tag fastener as claimed in claim 2, in which said heads are less flexible than said strip.

HENRY A. McCLELLAN.

References Cited in the file of this patent

UNITED STATES PATENTS

| Number | Name | Date |
|---|---|---|
| 33,554 | Yates | Oct. 22, 1861 |
| 470,411 | Peck | Mar. 8, 1892 |
| 941,659 | Shea | Nov. 20, 1909 |
| 1,211,296 | Davis | Jan. 2, 1917 |
| 2,157,806 | Tilton | May 9, 1939 |

FOREIGN PATENTS

| Number | Country | Date |
|---|---|---|
| 394,334 | Great Britain | June 21, 1933 |